May 31, 1960 H. J. McCREARY 2,938,959
RELAYLESS LINE CIRCUIT
Filed June 22, 1956
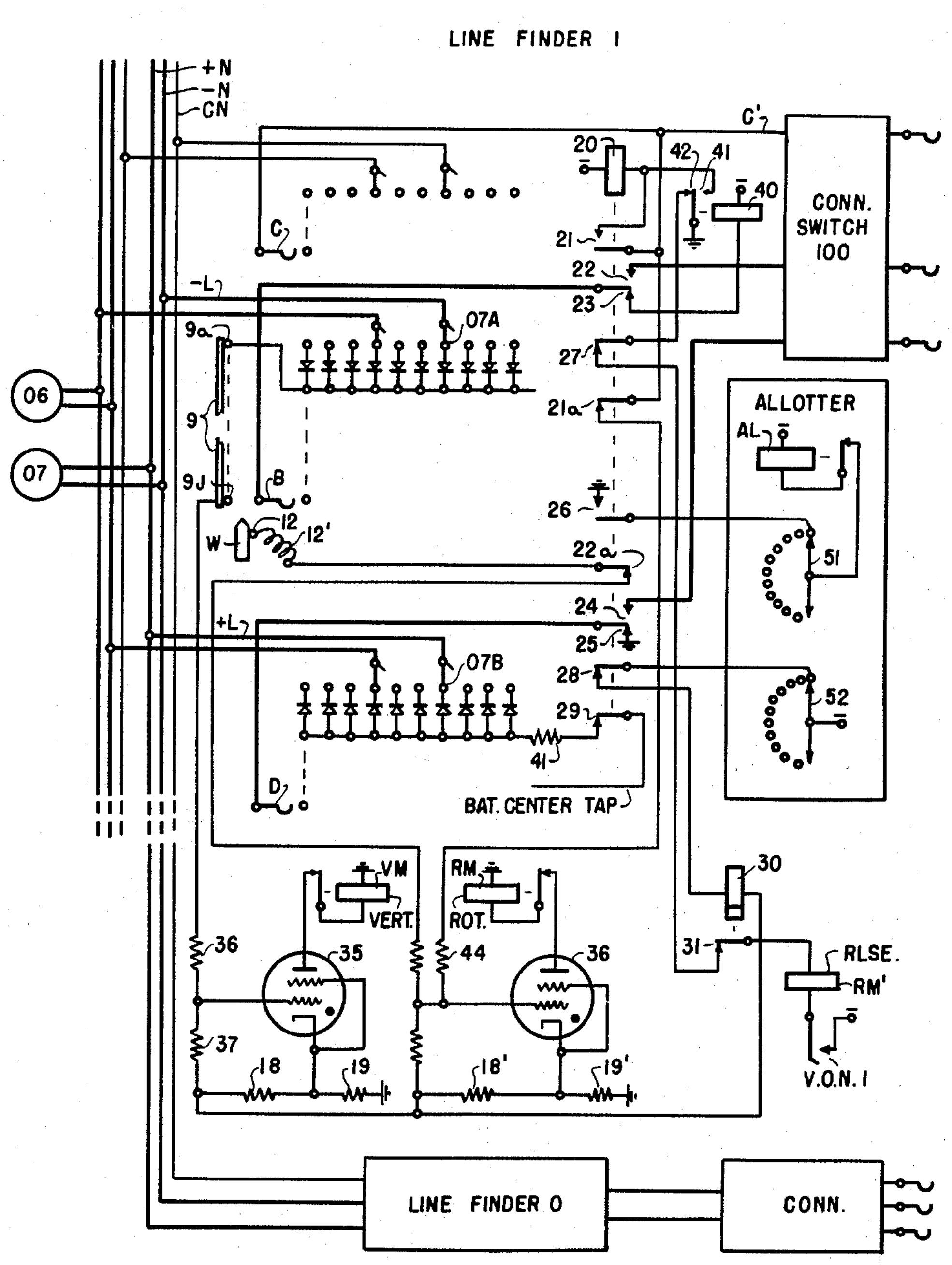
INVENTOR.
HAROLD J. Mc CREARY
BY Wm Walter Owen
ATTY.

United States Patent Office 2,938,959

Patented May 31, 1960

2,938,959

RELAYLESS LINE CIRCUIT

Harold J. McCreary, Lombard, Ill., assignor to General Telephone Laboratories, Incorporated, a corporation of Delaware Filed June 22, 1956, Ser. No. 593,118

15 Claims. (Cl. 179—18)

This invention relates to a relayless line circuit for use in a communication system and more particularly relates to an arrangement for a relayless telephone subscriber's line to transmit a calling signal on initiation of a call for controlling line finder apparatus to find the line, and for thereafter electrically isolating said line from the line finding apparatus, thereby enabling greater latitude in the design characteristics of the various circuit components than is permissible in present relayless line circuit arrangements.

Examples of relayless line circuit arrangements are shown in Patent Nos. 2,699,467 and 2,574,224, issued to Faulkner and Oberman, respectively, on January 11, 1955, and November 6, 1951, respectively. In these arrangements a voltage divider is always connected to the subscriber line to derive a calling signal voltage for controlling apparatus to find the calling line. The voltage divider at various times, may be partially in shunt with other equipment such as a switch line relay, ringing generator, ring cut-off relay or the connector switch back bridge relay. This imposes severe design problems in providing a true calling signal voltage and discriminating between a true as opposed to a false calling signal voltage especially where the impedance of the line may vary due to poor insulation, etc.

Briefly a calling line in the present invention first establishes a connection over its line conductors to the line finder control equipment through finder bank contacts and rectifiers individual thereto to provide a calling signal for initiating line searching and electrically interrupting the connection when the line is found. It eliminates the problems mentioned above by maintaining a calling or called line electrically disconnected from the line finder control equipment once the subscriber's line has been found by a line finder or has answered a call.

The drawing discloses the basic concept of the invention including the manner in which the subscriber's line is connected in the finder banks and shows an allotter arrangement for controlling the selection of the finder links.

The illustrated conventional finder banks are each modified to the extent that a common level contact 9J—9*a* is provided on each level and is associated with the contacts accessible to — line wiper B and each normally makes contact with a conducting strip 9. The finder wiper arrangement is also modified in any well-known manner so that in addition to a +, — and C wiper an additional level test wiper W, comprising a long insulation member such as Bakelite with a contact 12, is provided. The contact 12 has a flexible connection 12′ connecting it to its lead. On being stepped, wiper W sequentially separates and maintains separated each common level contact 9J—9*a* from conductor 9 and connects contact 12 to the common level contact 9J, etc. All wipers are stepped simultaneously except on rotary stepping, when wiper W remains in the position to which it has been stepped. Although the present invention is contemplated for use with the well-known Strowger type step-by-step switch arrangement, it may be used with many other type switches.

One subscriber's station 07, having its line conductors multipled to similar contacts for example 07A and 07B in each finder bank, is shown. The present description contemplates a 100 line system, and therefore ten finder banks and their associated finders are indicated in Fig. 1 by the lines extended from the station marked 07 to Line Finders 1 and 0. Another station indicated by the circle marked 06 is provided to illustrate the manner in which other stations are connected to the finder banks. Associated with each finder switch is a connector switch of any well-known type such as indicated by the block 100 so that the two form an integrated arrangement for extending a call to a called party as is well understood. Each contact level associated with the + wiper D in each finder bank has —24 volts connected from a battery center tap and a contact such as 29 on each line finder switch-through relay, through a resistor such as 41 and rectifiers individual to each contact to each +L conductor.

It is assumed that the allotter whose operation will be described later, has selected Line Finder 1. Allotter wiper 51 is then connected to the lower spring of contacts 26 and therefore completes no circuit, while wiper 52 has forwarded —48 volt battery through contacts 28, slow-to-operate release relay 30, through resistors 18 and 19 to ground in shunt with resistors 18′ and 19′, respectively. Thyratrons 35 and 36 individual to Line Finder 1 are therefore biased to below cut-off, but they are prepared to fire. Release relay 30 is operated to open a point in the incomplete circuit to the release magnet RM′ at contacts 31.

On initiation of a call the subscriber at station 07, for example, whose line terminates at contacts 07A and 07B in multiple with similar contacts at other banks, lifts his handset to connect his line conductors +L and —L across the station circuit. The —24 volts from the battery center tap and contacts 29 is positive with respect to the thyratron grid potential, and is therefore extended from the rectifier connected to contact 07B associated with the + wiper D, through the substation circuit, through the rectifier individual to contact 07A associated with the — wiper B to the common level contact 9*a* and the common conducting strip 9. Each finder has a switch through relay corresponding to 20 and the same center tap potential is forwarded from the corresponding contacts of the idle line finders, and through the corresponding bank contacts, however only at Line Finder 1 has the allotter prepared the thyratrons. The —24 volts is forwarded through resistors 36 and 37 to raise the grid potential with respect to its cathode potential of thyratron 35. Thyratron 35 therefore fires to energize the finder vertical magnet VM which opens its self-interrupting contacts to deenergize itself and thyratron 35.

Wiper W is stepped to its first position to disconnect the common level contact such as 9J at that level from the conducting strip 9. As —24 volt continues to be forwarded over the common level contact 9*a* in the zero level and conducting strip 9, thyratron 35 refires, when the self-interrupting contacts of VM close, to reoperate VM and step wiper W to the next level in the described manner. In the meantime springs VON1 close on the finder's first step to prepare a point in a circuit for magnet TM.

Wiper W is stepped in the described manner until it reaches the level at which the line conductors of the calling line are connected. It maintains the common level contact 9J, etc. of each level it has passed, separated from the strip 9. At the tenth level it opens the circuit for forwarding —24 volts to the grid of thyratron 35 by disconnecting contact 9*a* and strip 9 so that the tube 35 cannot be refired. It also forwards the −24 volts from common level contact 9a over contact 12 on wiper W and over contacts 22a to the grid of thyratron 36.

Thyratron 36 now fires to energize the rotary magnet RM. Rotary magnet RM steps wipers B, C and D in a rotary direction in a manner similar to that already explained for magnet VM. On reaching contact 07A wiper B forwards battery through the line relay 40 and contacts 23 to contact 07A to effectively terminate the application of the firing potential to the grid of tube 36. Rotary stepping is therefore halted. The battery is also connected through the subscriber station circuit to contact 07B associated with wiper D, and contacts 25 to ground to complete a circuit for operating relay 40. To prevent thyratron 36 from failing to refire in the event it encounters negative battery, when the finder wipers pass over the contacts of a busy line, ground, which is placed on the C wiper at that time in a manner which will become apparent, is forwarded over contacts 21a and resistor 44 to the grid of thyratron 36 to cause it to refire properly.

It will be noted that the battery and ground as described are now connected to the contacts individual to station 07 at each finder bank and that the rectifiers thereat are poled to prevent the passage of these potentials through the associated contacts at the bank of Line Finder 1 and at other finders banks. Relay 40 operates and closes contacts 41 to operate the switch-through relay 20 and it also opens contacts 42 to open another point in the circuit to the release magnet RM′.

The switch-through relay 20 on operating opens the described circuit for the line relay 40 at contacts 23 and 25 and extends the subscriber's line conductors +L and −L to the line relay (not shown) of the connector switch at contacts 22 and 24 to operate that relay in any well-known manner and maintain the proper grid and battery connections to the line conductors +L and −L. Ground which is returned over the C′ lead holds relay 20 operated over contacts 21, despite the release of relay 40. It also opens the circuit for forwarding the center tap voltage at contacts 29 so that the battery center tap is completely disconnected from the line conductors to prevent it from acting to shunt any other equipment connected to the line conductors. Contacts 22a are opened to disconnect contact 12 on wiper W from the grid of thyratron 36, and contacts 21a are opened to prevent ground returned over the C′ lead from firing thyratron 36. At contacts 28 the circuit to relay 30 is opened while at contacts 26 a circuit is completed for the allotter stepping magnet AL through wiper 51. The allotter now proceeds to search for an idle line finder. Relay 30 restores to prepare a point in a circuit to release magnet RM′, but this circuit is maintained open at contact 27. The subscriber now extends the call over the connector switch in any well-known manner and its function will be described as though on an incoming call to station 07.

The allotter magnet AL energizes over wiper 51 and contacts 26 to open its circuit at its self-interrupting contacts. On deenergizing it steps the wipers 51 and 52 to their respective succeeding contact. If ground is connected to the succeeding contact associated with wiper 51 indicating that the succeeding link is busy, the magnet AL is again energized to step its wipers again. If it does not then encounter ground, it remains deenergized to terminate further stepping. Battery is forwarded over wiper 52 to prepare the bias circuits for the thyratrons associated with the now selected idle link so that they will be fired properly on initiation of the next call.

On an incoming call the connector switch steps its wipers to the called line contacts in the connector banks. It will be recalled that on an outgoing call the connector bank contact corresponding to the calling line is busied by the ground forwarded to the C wiper from the connector. It is busied on an incoming call by ground furnished over the CN lead by the connector switch extending the call in any well-known manner. The connector switch on finding ground on the called party's terminal returns busy tone to the calling party and the connection is released by him.

In the event the called line is idle, ringing current with negative battery superimposed thereon is forwarded over the −N conductor and the called party's ringer and back over the +N conductor to ground in the connector switch. The battery on the −N conductor and the ground on the +N conductor are applied to the upper terminal of each rectifier connected thereto at the finder banks but the rectifiers at each contact are poled to prevent the potentials from being passed.

On answer by the called party the ring cut-off relay is operated to cut off the ringing generator and then the called loop is transferred to the connector back bridge relay, all in any well-known manner. However, the potentials on the called party's finder bank terminals remain as described.

On release of a call, the connector switch is restored in any well-known manner to remove ground from the C′ lead and restore relay 20. Relay 20 connects the battery center tap to resistor 41 and contact 12 to the grid of thyratron 36. In addition it completes a circuit to the release magnet RM′ from contacts 42, 27 and 31, which operates to restore the finder switch. Springs VON1 open to restore the release magnet RM′ and the finder switch is now available for another call.

Having described only one embodiment of my invention, I am appending hereto a series of claims which I believe encompasses the scope of the invention.

What is claimed is:

1. An arrangement for use in a telephone system wherein a plurality of subscriber lines have access to one of a plurality of finders having individually associated finder banks and wherein each line terminates in finder bank contacts individual thereto in each finder bank, the arrangement comprising means individually associated with each finder for providing a potential to the contacts of its associated finder bank, and means for selecting one of said finders whereby on initiation of a call from one of said lines said potential is extended over the finder bank contacts of said selected line finder and over said one line for initiating operation of the selected finder to cause said selected finder to be associated with said one calling line.

2. In an arrangement such as claimed in claim 1, means under control of said selected finder for terminating the provision of said potential to its associated finder bank contacts when it is associated with a calling line.

3. In an arrangement such as claimed in claim 1, means associated with each line and effective on a call to its associated line for preventing the transmission of a potential to the associated finder bank contacts for causing operation of any of said finders.

4. An arrangement for use in a telephone system comprising a plurality of finders with finder banks, a plurality of stations having lines terminating in individually corresponding bank contacts of each finder bank, a circuit including each line and its associated finder bank contacts prepared by each finder, means for completing said circuit on initiation of a call from one of said lines, and means individual to each finder and effective only at a predetermined time and on completion of said circuit for initiating operation of its associated finder.

5. An arrangement such as claimed in claim 4, in which said completed circuit is effective to identify said line in the finder bank associated with said operated finder to enable said finder to find said calling line, and means effective when said finder finds said calling line for interrupting said circuit.

6. A relayless line circuit for use in establishing a connection from one of a plurality of subscriber stations having individual lines to one of a plurality of finder switches accessible to any one of said stations, comprising means for selecting one of said switches, a circuit completed under control of a selected one of said switches for transmitting a potential over the line associated with a calling station, and means operated in response to the transmission of said potential over said circuit for operating said selected switch to associate it with said calling station.

7. An arrangement such as claimed in claim 6, in which said means for operating said switch includes a common contact for each group of subscriber lines and over which said potential is transmitted if the calling line is in the same group, a last contact common to all of said common contacts and to which said potential is transmitted, and means responsive to the operation of said selected switch for preventing the transmission of a potential from a group common contact to said last contact when said switch is associated with the group of lines with which the calling line is associated.

8. For use with a finder switch having a finder bank in which subscriber lines terminate and wherein said lines are arranged in groups, the improvement comprising a contact for each group of subscriber lines, means for operating said finder to associate said finder sequentially with each group of subscriber lines, a common contact arranged to forward a potential from any one of said group contacts on initiation of a call by one of said lines for operating said means to associate said finder sequentially with said groups of subcsriber lines, and means effective on operation of said finder for preventing the forwarding of said potential by said common contact when said finder is associated with the group of subscriber lines having a calling line.

9. In an arrangement such as claimed in claim 8, other means effective to transmit said potential from a group contact associated with a group of lines having a calling line after said finder is associated with said group of lines, means operated by said then transmitted potential for operating said finder, and means operated by said finder on association with a calling line in said group for preventing the transmission of said potential by said other means.

10. For use with a finder switch having a finder bank in which subscriber lines terminate and wherein said lines are arranged in groups, a group terminal for each group of lines terminating in said finder bank, means connected to all of said group terminals and effective on initiation of a call by one of said lines for operating said finder, and means operated by said operated finder for disconnecting each group terminal successively from said connected means to terminate operation of said finder, when said finder is associated with the group of lines having a calling line.

11. An arrangement for use in a telephone system for establishing a connection from a station to certain central office switching equipment accessible to a plurality of stations, the improvement comprising first means controlled by said equipment and effective on initiation of a call from one of said stations for providing a potential indicative of a call from said station, means operated responsive to the provision of said potential for associating said equipment with said one calling station, and means controlled by said equipment for controlling said first means to terminate the provision of said potential responsive to said equipment being associated with said one calling station.

12. An arrangement for use in a telephone system for establishing a connection from a station to certain central office switching equipment accessible to a plurality of stations, the improvement comprising means controlled by said equipment and effective on initiation of a call from one of said stations for providing a potential indicative of a call from said station, means including an electronic valve controlled in response to the provision of said potential for associating said equipment with said one calling line, and means for periodically interrupting the control exercised by said potential over said valve.

13. An arrangement for use in a telephone system for establishing a connection from a station to certain central office switching equipment accessible to a plurality of stations over line conductors and finder bank contacts individual to each station, the improvement comprising a circuit completed by said equipment on initiation of a call for the transmission of a potential over the line conductors and finder bank contacts associated with said calling station, other means operated responsive to the provision of said potential for associating said equipment with said one calling station and means in said circuit effective to prevent the operation of said other means responsive to the provision of a potential on a call to one of said stations.

14. An arrangement for use in a telephone system to establish a connection from a calling one of a plurality of subscriber lines to automatic equipment accessible to any one of said lines for extending a call therefrom, the improvement comprising means controlled by said equipment for providing a calling signal to any one of said lines, means effective on initiation of a call by one of said lines for transmitting said signal over said one line to identify said line, means associated with said equipment and operated on transmisison of said signal for associating said equipment with said identified line to extend a call therefrom, and an arrangement controlled by said equipment to terminate the provision of said signal responsive to said equipment being associated with said one calling station.

15. In a telephone system a plurality of finders each having a plurality of finder banks individual thereto, a plurality of stations each terminating on an individually associated contact of each finder bank, groups of contacts of each bank connected in common, a rectifier interposed between each contact and its commonly connected group of contacts, a source of potential, means for applying said source of potential to the groups of commonly connected contacts in one finder bank whereby said potential is extended on initiation of a call from one of said lines over said one line and the contact terminating said line in a commonly connected group of contacts in another finder bank, means responsive to the extension of said potential to the commonly connected contacts of said other bank for operating the finder having access to said other bank to test a group of commonly connected contacts therein for the presence of said potential, and means operated responsive to said finder testing said other group of commonly connected contacts for testing each contact in said other group.

References Cited in the file of this patent

UNITED STATES PATENTS

| | | |
|---|---|---|
| 2,697,750 | Buchner et al. | Dec. 21, 1954 |
| 2,699,467 | Faulkner | Jan. 11, 1955 |
| 2,794,859 | Abbot et al. | June 4, 1957 |